United States Patent [19]

Crehan et al.

[11] Patent Number: 4,611,306
[45] Date of Patent: Sep. 9, 1986

[54] DISPLAY MENU/CHART KEY

[75] Inventors: Donald T. Crehan, Gaithersburg, Md.; Charles J. Lovell, Austin, Tex.

[73] Assignee: International Business Machines Corp., Armonk, N.Y.

[21] Appl. No.: 493,572

[22] Filed: May 11, 1983

[51] Int. Cl.[4] ................ G06F 15/62; G06F 3/037; G06F 15/626; G09G 3/02
[52] U.S. Cl. ................................ 364/900; 364/521; 340/712; 340/747
[58] Field of Search ... 364/200 MS File, 900 MS File, 364/521, 522; 340/712, 721, 747

[56] References Cited

U.S. PATENT DOCUMENTS

| | | | |
|---|---|---|---|
| 3,879,722 | 4/1975 | Knowlton | 340/705 |
| 4,430,725 | 2/1984 | Elliot et al. | 364/900 |
| 4,435,772 | 3/1984 | Suzuki et al. | 364/520 |
| 4,441,163 | 4/1984 | Leikam et al. | 364/900 |
| 4,454,576 | 6/1984 | McInroy et al. | 364/200 |
| 4,456,969 | 6/1984 | Herzik et al. | 364/900 |
| 4,458,311 | 7/1984 | Clements et al. | 364/200 |
| 4,458,331 | 7/1984 | Amezcua et al. | 364/900 |
| 4,476,462 | 10/1984 | Feldman | 340/711 |
| 4,479,197 | 10/1984 | Haag et al. | 364/900 |

FOREIGN PATENT DOCUMENTS 8200726  3/1982  PCT Int'l Appl. ............... 340/712

OTHER PUBLICATIONS

"Lotus Development Corporation's 1-2-3" by Gregg Williams; Byte, Dec. 1982, pp. 182-198.
"Introduction 1-2-3 It'll Have Your IBM/PC Jumping Through Hoops"; Byte, Apr. 1983, vol. 8, No. 4.
"Lotus 1-2-3" advertisement; Byte, Feb. 1983, vol. 8, No. 2.
Xerox Disclosure Journal, vol. 4, No. 5, Sep./Oct. 1979, p. 641, H. Wallace Swanstrom: "Selection of Options".
IBM Technical Disclosure Bulletin, vol. 25, No. 3B, Aug. 1982, pp. 1785-1786, Adam et al.: "Menu and Command Language Interface for Information Processing System".
Wescon Technical Paper, vol. 26, Sep. 1982, pp. 32/2/1-32/2/2, G. Romans: "Color Program Without Keyboards".

Primary Examiner—James D. Thomas
Assistant Examiner—Thomas Lee
Attorney, Agent, or Firm—C. Lamont Whitham

[57] ABSTRACT

A display menu/chart key is provided in a word processing system to allow a system operator to toggle back and forth between the display of a menu used to define a graphics image and the graphics image to the extent that the graphics image has been defined by the menu. This provides an easy interface that allows the operator to visually check and revise the definition of a graphics image such as a bar, line or pie chart. By using this key, the operator can quickly see how changing a menu item will cause the chart to be changed and the particular portion of the chart that will change. When the key is pressed while a chart is being displayed, the last menu being processed will again be displayed.

3 Claims, 3 Drawing Figures

DISPLAY MENU/CHART KEY

RELATED APPLICATIONS

This application is related to the following concurrently filed applications which are assigned to a common assignee and are incorporated herein by reference:

Application Ser. No. 493,578, filed May 11, 1983, by Jerold D. Dwire and Donald T. Crehan and entitled "Display of Graphics Using a Non-All Points Addressable Display", now U.S. Pat. No. 4,556,878 issued Dec. 3, 1985.

Application Ser. No. 493,677, filed May 11, 1983, by Danny B. Convis, Donald T. Crehan and Charles J. Lovell and entitled "Internal Image and Bit Array for Display and Printing of Graphics", now U.S. Pat. No. 4,555,700 issued Nov. 26, 1985.

Application Ser. No. 493,581, filed May 11, 1983, by David B. Robertson, Stephen A. Waugh, Mary F. Piller, Donald T. Crehan, and Charles J. Lovell and entitled "Independent Image and Annotation Overlay with Highlighting of Overlay Conflicts".

FIELD OF THE INVENTION

This invention generally relates to word processing systems having a graphics display capability, and more particularly to the provision in such systems of an easy interface that allows the operator to visually check and revise the definition of a chart during the course of data entry.

BACKGROUND OF THE INVENTION

Word processing systems have evolved from relatively simple text processors which facilitated the manipulation of character strings to the sophisticated multitasking processors of today which are capable of such diverse applications as communications, calculations and data processing emulations. It is not uncommon, for example, to provide a word processing system with a calculation application to facilitate the preparation of financial statements or similar business documents. Moreover, it has become popular to expand the calculation application to include the generation of graphics data based on calculated or input numerical data. This is because it is often easire to interpret the numerical data when it is presented as a bar, pie, or line graph, for example.

In one typical application, the operator first enters numerical data in a spread sheet display, and when the data entry and/or calculations are completed, then the operator keys a request for a menu for generating a graphics display. When this menu is diplayed, the operator first selects the type of chart desired and then the scale or other parameters of the chart selected. Only then can the operator request a display of the chart. When the chart is finally displayed, the operator may find that the scale selected is not appropriate for the data entered or may even decide that the chart selected does not present the data in the most advantageous way. The operator must then return to the appropriate menu to make the necessary changes. Another application takes a different approach to data entry and graphics generation. More specifically, the operator begins by first selecting the type of chart desired, and then prompted by another menu or menus, the opterator specifies the scale and other parameters of the chart selected. After the chart has been defined, a data entry menu is displayed to permit the operator to enter numerical data. If the data entered is changed, the operator may need to page back through several menus and the entire process may have to be repeated. As will be appreciated, the procedure can be time consuming and cumbersome, burdening, as it does, the operator with having to remember the key sequence that displays the chart and the key sequence that displays the menus.

SUMMARY OF THE INVENTION

It is therefore an object of the invention to provide in a word processing system having a graphics display capability an "easy" interface that allows the operator to visually check and revise the definition of a chart.

It is another object of the invention to provide a graphics create and revise procedure in a word processing system which allows the operator to quickly and easily page back and forth between the chart display and the last menu accessed by the operator.

It is a further object of the invention to provide the operator of a word processing system with an simple way to check the progress of defining a chart at any time during the definition of the chart.

The objects of the invention are accomplished according to the invention by providing a dedicated display menu/chart key on the keyboard of the word processing system. This single key causes the chart to be displayed and also causes a return from displaying the chart to the menu in the chart definition that was active when the key was pressed to display the chart. In this way, the operator has a simple way to quickly see how changing a menu item will cause the chart to be changed and the particular portion of the chart that will change. The operator can now easily check the progress of defining a chart by viewing it as it is currently defined, as well as being able to continue defining the chart or modify some definition that had been entered, all without having to page through several menus to perform each operation.

BRIEF DESCRIPTION OF THE DRAWINGS

The foregoing and other objects, aspects and advantages of the invention will be better understood from the following detailed description of a preferred embodiment of the invention with reference to the accompanying drawings, in which.

DETAILED DESCRIPTION OF THE INVENTION

Figure 1:
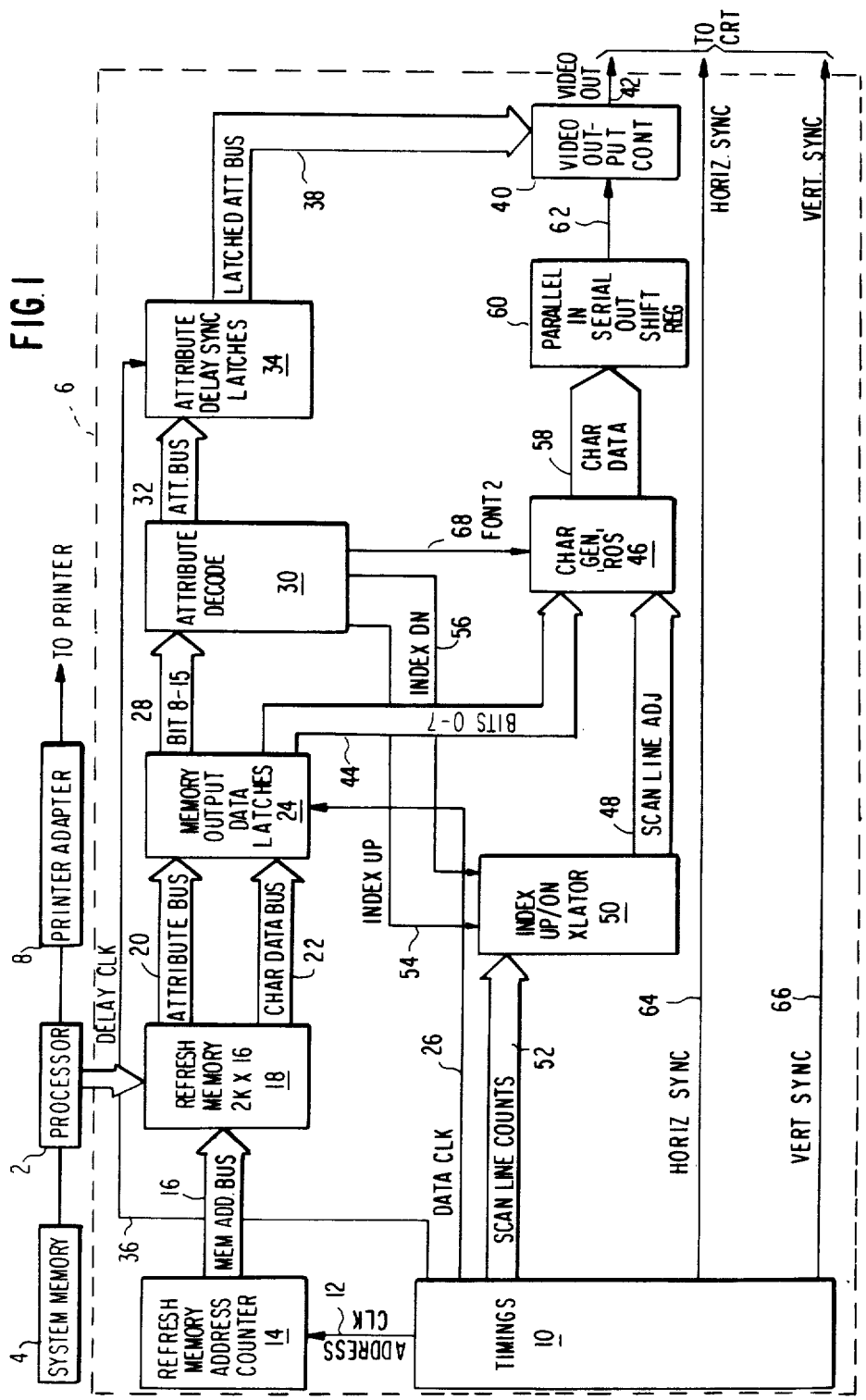
FIG. 1 is a block diagram of a word processing system in which the present invention is embodied.

Referring now to the drawings, and more particularly to FIG. 1, there is shown a block diagram of a typical implementation of a word processor in which the present invention is embodied. The system includes a processor 2, a system memory 4, a display adaptor 6, and a printer adaptor 8. The system memory 4 contains the bit array and the internal image array which are described in more detail in U.S. Pat. No. 4,555,700 entitled "Internal Image and Bit array for Display and Printing of Graphics". Only the connections between processor 2, system memory 4, display adaptor 6 and the printer adaptor 8 are shown as needed for purposes of explanation of the invention, all other interconnections therebetween being well understood by those skilled in the art.

In the display adaptor 6, the timings block 10 provides various clocking signals for the word processor display function. The address clock signal on line 12 is input to refresh memory address counter 14 whose output appears on memory address bus 16. The address on bus 16 is input to the refresh memory 18. Attribute bus 20, as well as character data bus 22, are two outputs from refresh memory 18. The data on both buses 20 and 22 are latched into memory output data latches 24. Another clock signal from the timings block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The output of output control 40 on line 42 is the video input to the CRT display monitor (not shown).

The other eight bits of character data are output from memory output data latches 24 along bus 44 to the character generator ROS 46. The character generator ROS 46 also receives scan line adjustment data on bus 48 from index up or down translator 50 and input Font2 on line 68 from attribute decoder 30. The translator 50 receives the scan line count on bus 52 from the timings block 10 and is controlled by signals from attribute decoder 30 on lines 54 and 56 to index up or down in order to provide superscript and subscript functions. The character data output on bus 58 from the character generator ROS 46 is read into a parallel in, serial out shift register 60. The serial character data strings are read out of shift register 60 on line 62 to the video output control 40. The timings block 10 also provides horizontal sync and vertical sync signals on lines 64 and 66 to the display CRT.

Figure 2:
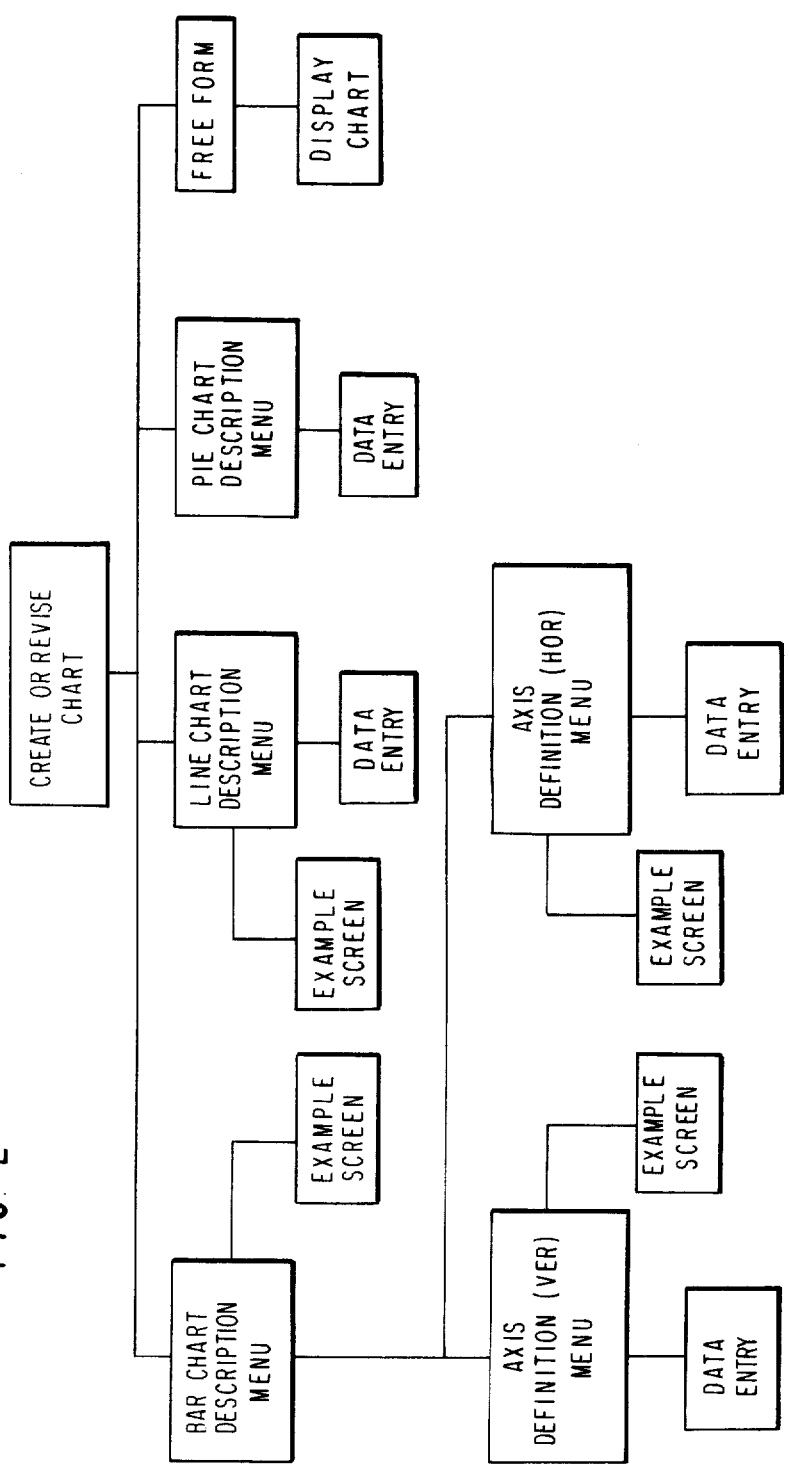
FIG. 2 is a flow chart showing the basic sequence of menus used to define a chart using the word processing system shown in FIG. 1.

The flow chart of FIG. 2 shows the hierarcical organization of the chart menus used to define a chart using the word processing system shown in FIG. 1. It will be observed that the organization is that of an inverted tree with the "root" menu being that for "Create or Revise Chart" and the "leaves" being an appropriate "Data Entry" menu. The type of chart chosen by the operator determines the path taken in the flow chart shown in FIG. 2. The "Create or Revise Chart" menu is shown below:

| CREATE OR REVISE CHART | | | |
|---|---|---|---|
| ID | ITEM | YOUR CHOICE | POSSIBLE CHOICES |
| a | Comment | | |
| b | Change Paper Size or Source | | |
| c | Type of Chart | 1 | 1 = Bar Chart |
| | | | 2 = Line Chart |
| | | | 3 = Pie Chart |
| | | | 4 = Free-Form Chart |
| When finished with this menu, press ENTER. | | | |
| Type ID letter to choose ITEM; press ENTER: ⊞ | | | |

In the menu illustrated above, a bar chart has been chosen by typing in the numeral "1" and pressing the "Enter" key. It will of course be understood that a line chart, a pie chart or a free-form chart could be chosen by typing in the numeral "2", "3" or "4", as appropriate, and pressing the "Enter" key. Before the choice of chart type is made, however, it is first necessary to type the ID letter "c" at the displayed cursor "⊞" and then press the "Enter" key. Following the example of the choice of a bar chart, it will be observed in FIG. 2 that the the path taken is to the left. The next menu displayed is shown below:

| BAR CHART DEFINITION | | | |
|---|---|---|---|
| ID | ITEM | YOUR CHOICE | POSSIBLE CHOICES |
| a | Display Example Screen | | |
| b | Direction of Bars | 1 | 1 = Vertical |
| | | | 2 = Horizontal |
| c | Grouping of Bars | 1 | 1 = Single |
| | | | 2 = Side-by-side |
| | | | 3 = Stacked |
| d | Maximum Number of Bars at Each Label | 1 | (1–4) |
| When finished with this menu, press ENTER. | | | |
| Type ID letter to choose ITEM; press ENTER: ⊞ | | | |

In the menu shown above, a vertical bar chart has been chosen causing the "Axis Definition" menu for vertical bar charts shown below to be displayed:

| AXIS DEFINITION (Vertical Bar Chart) | | | |
|---|---|---|---|
| ID | ITEM | YOUR CHOICE | POSSIBLE CHOICES |
| a | Display Example Screen Vertical Axis | | |
| b | Total Number of Labels | 5 | (2–13) |
| c | Top Label Value | 100 | |
| d | Bottom Label Value Horizontal Axis | 0 | |
| e | Total Number of Labels | 3 | (1–24) |
| When finished with this menu, press ENTER. | | | |
| Type ID letter to choose ITEM; press Enter: ⊞ | | | |

The next menu to be displayed is the data entry menu for a vertical bar chart. This menu is shown below:

| Labels Along Horizontal Axis | Column 1 Bar Names | Column 2 Bar Names | Column 3 Bar Names | Column 3 Bar Names |
|---|---|---|---|---|
| vvvv | | | | |
| 1 ⊞ | ⊞ | ⊞ | ⊞ | ⊞ |
| 2 ⊞ | ⊞ | ⊞ | ⊞ | ⊞ |
| 3 ⊞ | ⊞ | ⊞ | ⊞ | ⊞ |
| 4 ⊞ | ⊞ | ⊞ | ⊞ | ⊞ |
| 5 ⊞ | ⊞ | ⊞ | ⊞ | ⊞ |
| 6 ⊞ | ⊞ | ⊞ | ⊞ | ⊞ |
| 7 ⊞ | ⊞ | ⊞ | ⊞ | ⊞ |
| 8 ⊞ | ⊞ | ⊞ | ⊞ | ⊞ |
| 9 ⊞ | ⊞ | ⊞ | ⊞ | ⊞ |
| 10 ⊞ | ⊞ | ⊞ | ⊞ | ⊞ |
| 11 ⊞ | ⊞ | ⊞ | ⊞ | ⊞ |
| 12 ⊞ | ⊞ | ⊞ | ⊞ | ⊞ |

Column commands are valid when cursor is placed on '⊞'.
'vv' marks the number of characters used for labels.

Going back to the "Bar Chart Definition" menu, if a horizontal bar chart had been chosen instead of a vertical bar, chart, the "Axis Definition" menu for a horizontal bar chart would have been displayed. This menu differs from the "Axis Definition" menu shown above for a vertical bar chart in that the vertical and horizontal axes labels are interchanged. Likewise, a similar data entry menu would thereafter be displayed except that the left hand column is labeled "Labels Along Vertical Axis".

Suppose that a bar chart is not selected but instead a line chart is selected. In this case, the following menu is displayed:

| LINE CHART DESCRIPTION | | | |
|---|---|---|---|
| ID | ITEM | YOUR CHOICE | POSSIBLE CHOICES |
| a | Display Example Screen | | |
| b | Number of Lines | 1 | (1-4) |
| | Vertical Axis | | |
| c | Total Number of Labels | 5 | (2-15) |
| d | Top Label Value | 100 | |
| e | Bottom Label Value | 0 | |
| | Horizontal Axis | | |
| f | Total Number of Labels | 3 | (1-24) |

When finished with this menu, press ENTER.
Type ID number to choose ITEM; press ENTER: ⊞

Once the line chart had been defined using this menu, the "Data Entry" menu for the line chart would be displayed. This menu is quite similar to that shown above for the vertical bar chart except that the word "line" is substitued for the word "bar" at the heading of each of the four data entry columns.

Finally, suppose that a pie chart had been selected instead of the bar chart as illustrated in the "Create or Revise Chart" menu shown above. In this case, a simple two column "Data Entry" menu for the pie chart is displayed. The first column has the heading "Section Labels" and the second column has the heading "Values". FIG. 2 does show yet another possibility, that of a free-form chart, but that does not involve data entry. FIG. 2 is itself a good example of a free-form chart.

In the creation or revision of a chart as described above, it will be recalled that as each menu in succession is finished, the "Enter" key is pressed. Thus, by pressing the "Enter" key, the operator can page from the "root" to the "leaves" in the tree structure shown in FIG. 2. It is also possible to page backward from the "leaves" to the "root" by pressing another key provided specifically for that purpose. The problem solved by this invention is to provide an easy to use interface to the operator that gives the operator the capability to check the progress of the chart definition and to return to the current place in the chart definition with a minimum of keystrokes. Requiring a single keystroke was chosen as the optimum. Allowing no keystrokes suggests a timed image display, and this could be an undesirable interface in that multiple keystrokes would be required to display the chart image for long periods of time. Allowing, or, worse yet, requiring the operator to set or define the time intervals would make the interface more cumbersome. Further, more than a single keystroke would not satisfy the "minimum" requirement implicit in the easy to use interface.

The solution according to the invention is to provide a single key on the keyboard that causes the chart to be displayed and also causes a return from displaying the chart to the menu in the chart definition process that was last active before the key was pressed to display the chart. For example, suppose the operator has selected to display a vertical bar chart but has not yet defined the axis parameters or entered any numerical data. By pressing the display menu/chart key, the operator can have the chart displayed which at this point would consist of horizontal and vertical axes. By again pressing the display menu/chart key, the last active menu would be displayed which in this case would be the "Axis Definition" menu. When the operator is finished with this menu, the "Data Entry" menu will be displayed, but before entering data, the operator can again press the display menu/chart key to observe the axes of the chart has it has been defined. Pressing the display menu/chart key again will cause the "Data Entry" menu to be displayed again. At any time while the operator is entering data into this menu, the display menu/chart key can be pressed to see how the chart is developing. In this way, the operator has a simple way to check the progress of defining the chart by viewing it as it is currently defined, as well as having a simple way to continue defining the chart, or to modify some definition that had been previously entered, without having to page back and forth through several menus, or worse, having to start at the beginning of the process.

Figure 3:
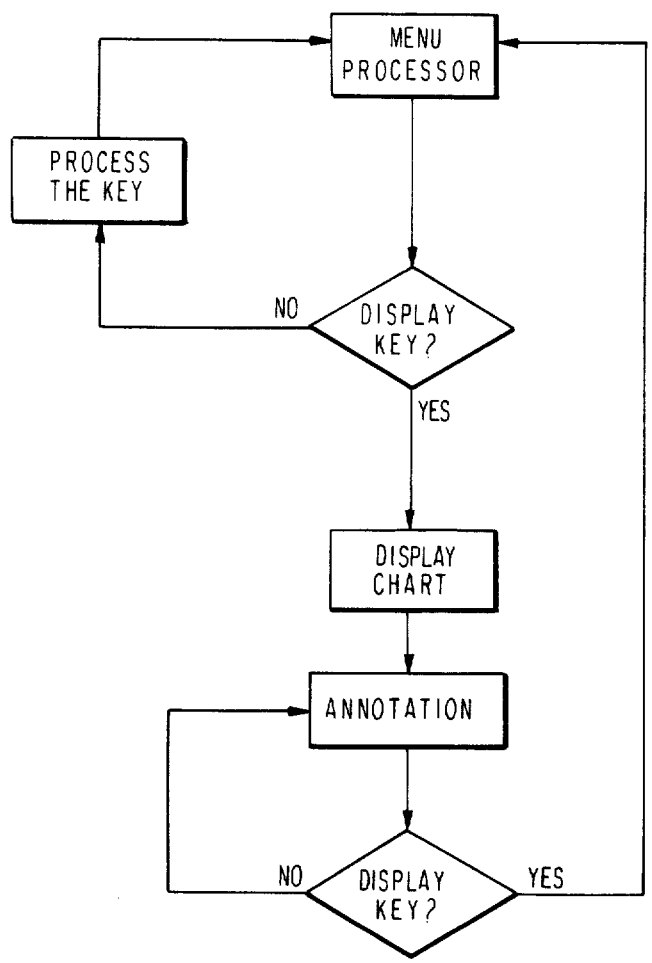
FIG. 3 is a flow diagram showing the display process using the display menu/chart key according to the present invention.

FIG. 3 shows a flow diagram illustrating the operation using the display menu/chart key according to the invention. The operator begins by defining the chart using the various menus that define the chart type, scaling, orientation, data to be plotted and so forth. During this time, the keyboard is monitored to determine if the display menu/chart key has been pressed. If it has not been pressed, the key that has been pressed is processed in the usual way. At some point during the definition, the operator may decide to see what the chart looks like at the current stage of the definition and so presses the display menu/chart key. This is detected by the menu processing software which then calls the display chart processing software. In response to this call, the chart is built and displayed to the extent possible with the current chart definition. At this point, the operator would be allowed to "annotate" the chart as may be desired. Application Ser. No. 493,581 entitled "Independent Image and Annotation Overlay with Highlighting of Overlay Conflicts" describes this process. After making an annotation or not, the operator might then decide to continue defining the chart, or to redefine some part or all of the chart. To do this, the operator again presses the display menu/chart key, and the display chart processing software recognizes this as the signal to return to the menu processing software. Those skilled in the art will understand that the nature of the "call" and "return" functions in software is that the point of operation will continue after a "return" at the point immediately after the "call". The procedure is well known and will not be described in any further detail. The important thing to understand is how the procedure is used in the operation of the invention. Thus, when the menu is displayed again, the operator can continue with the chart definition until completed or until s/he wants to view the chart again at the new level of completion.

The display menu/chart key according to the invention need not be an added key to the word processing system keyboard. In the preferred embodiment, the display menu/chart key is a software defined key that is recognized by both the menu processing software and the display chart processing software. In this way, the key may be used to toggle back and forth between the display of the current menu and the chart.

We claim:

1. A process for interactively constructing a graphic image on a video display terminal provided with a display menu/chart key for toggling between the display of a menu and the display of a chart comprising the steps of:

displaying to an operator a construction menu listing a plurality of selectable construction parameters which define the grahic image to be constructed;

displaying a data entry menu to said operator after the construction parameters have been selected in said construction menu and allowing the operator to enter data or change data already entered in said data entry menu at any time during said process for interactively constructing a graphic image when said data entry menu is displayed;

upon detecting the actuation of said display menu/chart key while displaying said data entry menu, displaying to the operator a graphic image on said video display terminal as defined by entered and changed data at the time said display menu/chart key is activated; and upon detecting the actuation of said display menu/chart key while displaying said graphic image, redisplaying said data entry menu so that the operator can view the progress of constructing the graphic image on said video display terminal as data is entered or changed in said data entry menu at any time during said process of interactively constructing a graphic image by toggling between the display of said data entry menu and the chart.

2. The process for interactively constructing a graphic image on a video display terminal as recited in claim 1 wherein the operator is allowed to select construction parameters of change construction parameters already selected in said construction menu at any time during said process for interactively constructing a graphic image when said construction menu is displayed further comprising the steps of:

upon detecting the activation of said display menu/chart key while displaying said construction menu, displaying to the operator a graphic image on said video display terminal as defined by the construction parameters selected or changed when said display menu/chart key was activated; and upon detecting the actuation of said display menu/chart key while displaying said graphic image, redisplaying said construction menu so that the operator can view the chart as defined by construction parameters which have been selected and changed in said construction menu at any time during the process of defining the graphic image to be constructed.

3. A process for interactively constructing a business chart on a video display terminal provided with a display menu/chart key for toggling between the display of a menu and the display of a business chart, the type of business chart being a bar chart, a pie chart or a line graph, said process comprising the steps of:

displaying to an operator a construction menu listing a plurality of selectable construction parameters which define the business chart, said construction parameters including the type of business chart and its scale, and allowing the operator to select construction parameters or change construction parameters already selected in said construction menu at any time during said process for interactively constructing a graphic image when said construction menu is displayed;

upon detecting the activation of said display menu/chart key while displaying said construction menu, displaying to the operator a graphic image on said video display terminal as defined by the construction parameters selected when said display menu/chart key was activated provided the type of business chart has been selected; and upon detecting the activation of said display menu/chart key while displaying said graphic image, redisplaying said construction menu so that the operator can view the chart as defined by construction parameters which have been selected and changed in said construction menu at any time during the process of defining the graphic image to be constructed.

* * * * *

UNITED STATES PATENT AND TRADEMARK OFFICE
CERTIFICATE OF CORRECTION

PATENT NO. : 4,611,306
DATED : September 9, 1986
INVENTOR(S) : D. T. Crehan et al It is certified that error appears in the above—identified patent and that said Letters Patent is hereby corrected as shown below:

Column 7, line 29, "of" should read --or--.

Signed and Sealed this

Twenty-seventh Day of January, 1987

Attest:

DONALD J. QUIGG

Attesting Officer   Commissioner of Patents and Trademarks